United States Patent [19]

Mitchell

[11] 4,099,310
[45] Jul. 11, 1978

[54] BATTERY TERMINAL CLEANER

[76] Inventor: Robert Lynn Mitchell, 2300 Fite Rd., Memphis, Tenn. 38127

[21] Appl. No.: 825,436

[22] Filed: Aug. 17, 1977

[51] Int. Cl.² .............. B23D 71/00; B08B 1/00; B23B 3/00
[52] U.S. Cl. .................. 29/79; 15/104.04; 82/1 R; 408/203.5
[58] Field of Search ............... 29/78, 79; 82/1, 4 R, 82/4 C; 407/8; 408/203.5, 207; 15/236 C, 236 R, 104.03, 104.04, 104.05, 104.15, 105

[56] References Cited

U.S. PATENT DOCUMENTS

| 1,774,567 | 9/1930 | Raphael | 15/104.04 |
| 2,204,516 | 6/1940 | Stone | 82/1 |

FOREIGN PATENT DOCUMENTS

| 19,308 | 9/1935 | Australia | 15/104.03 |
| 1,032,246 | 2/1951 | France | 29/78 |

Primary Examiner—Harrison L. Hinson
Attorney, Agent, or Firm—John R. Walker, III

[57] ABSTRACT

A device for cleaning the terminals of a typical wet cell automobile battery or the like. The device includes a body having first body member with a cavity therein for receiving a portion of the terminal to be cleaned and having a second body member with a cavity therein for receiving another portion of the terminal to be cleaned. A plurality of teeth members are attached to portions of the cavities in the first and second body members for engaging portions of the battery terminal received in the cavities. The device includes a spring positioned circumferentially about the first and second body members for uniformly urging the cavities of the first and second body members towards one another to cause the teeth members attached thereto to engage the battery terminal received in the cavities so that when the body is rotated, the teeth members will engage and clean the battery terminal.

6 Claims, 7 Drawing Figures

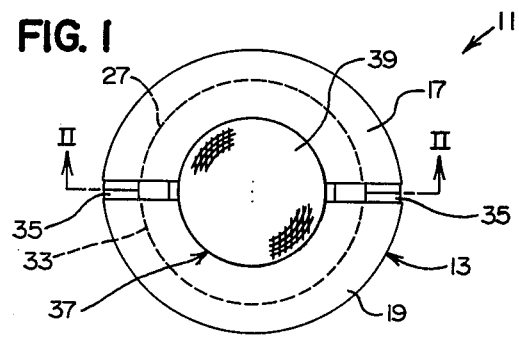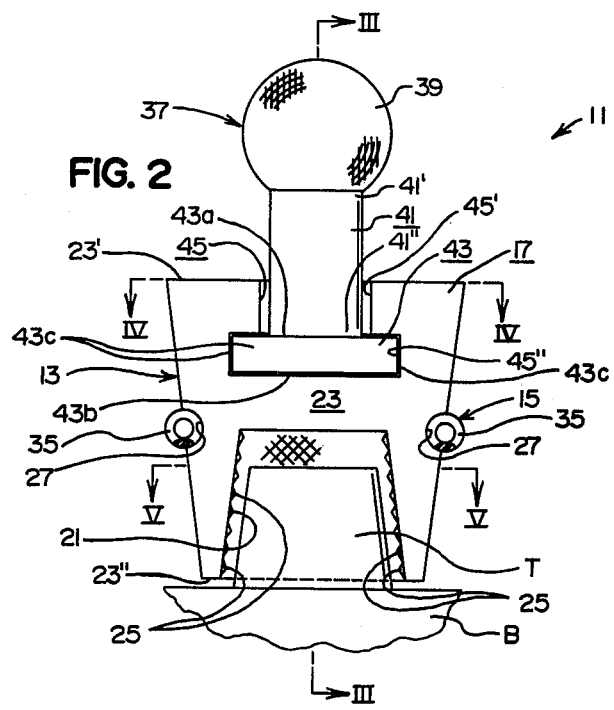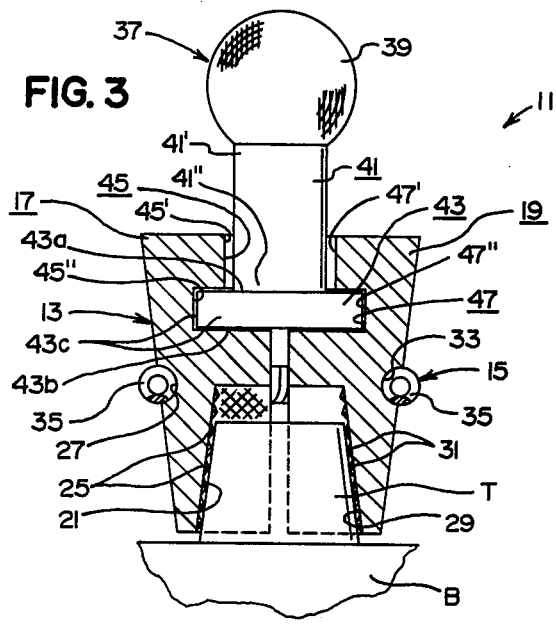

BATTERY TERMINAL CLEANER

BACKGROUND OF THE INVENTION

1. Field of the Invention

This invention relates generally to means for cleaning the terminals of storage batteries and the like.

2. Description of the Prior Art

Heretofore, various means for cleaning the terminals of storage batteries and the like have been developed. See, for example, Raphael, U.S. Pat. Nos. 1,774,567; McKenna, U.S. Pat. No. 1,913,606; Coffey, U.S. Pat. No. 2,003,629; Stone, U.S. Pat. No. 2,204,516; Williams, U.S. Pat. No. 2,405,680; Plumley, U.S. Pat. No. 2,475,514; and DeAmicis, U.S. Pat. No. 3,745,622. Babcock, U.S. Pat. No. 2,045,511, discloses a polishing device which, while not relating to battery terminal cleaners of the present invention, may be of value to persons wishing to make and/or use the present invention. None of the above patents disclose or suggest the present invention.

Before the present invention, all battery terminal cleaners were disadvantageous for one reason or another. For example, certain of the prior battery cleaners such as those of the above disclosed Raphael, McKenna, Coffey and Williams patents result in inconsistent cleaning of the battery terminals under normal conditions because they rely on pressure being exerted against the devices by the user thereof to determine the amount of material removed from the battery terminals being cleaned. In general, all the known prior battery terminal cleaners have one or more of the following disadvantages: complexity of manufacture, complexity of assembly, inconsistency of performance, difficulty of keeping clean, nonreliability, nondurability, nonrepairability, heaviness, bulkiness, dangerous to use, etc.

SUMMARY OF THE INVENTION

The present invention is directed towards overcoming the problems and disadvantages of prior means for cleaning battery terminals and the like. The concept of the present invention is to provide a self-adjusting battery terminal cleaner which provides uniform cleaning of battery terminals, which is simple to manufacture and assemble, which is durable, which is easy to keep clean, which is constructed of individually replacable components, which is safe to use, and which is light weight.

The battery terminal cleaner of the present invention includes a body means for placement over the battery terminal to be cleaned, the body means including a first body member having a cavity therein for receiving a portion of the battery terminal to be cleaned and having a plurality of teeth members attached to portions of the cavity for engaging portions of the battery terminal to be cleaned, the body means including a second body member having a cavity therein for receiving another portion of the battery terminal to be cleaned and having a plurality of teeth members attached to portions of the cavity for engaging portions of the battery terminal to be cleaned; and spring means positioned circumferentially about the first and second body members for uniformly urging the cavities of the first and second body members towards one another to cause the teeth members of the first and second body members to engage any battery terminal received in the cavity so that when the body means is rotated, the teeth members will clean the battery terminal.

BRIEF DESCRIPTION OF THE DRAWINGS

FIG. 1 is a top plan view of the battery terminal cleaner of the present invention.

FIG. 2 is a sectional view thereof as taken on line II—II of FIG. 1 showing a battery terminal received therein.

FIG. 3 is a sectional view thereof as taken on line III—III of FIG. 2.

DESCRIPTION OF THE PREFERRED EMBODIMENT

The battery terminal cleaner 11 of the present invention is for use in cleaning terminals T of electric storage batteries B or the like such as those typically used in automobiles and the like. The battery terminal cleaner 11 includes, in general, a body means 13 and a spring means 15.

Figure 5:
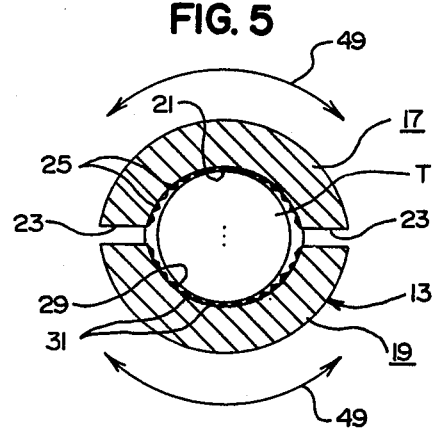
FIG. 5 is a sectional view thereof as taken on line V—V of FIG. 2.

The body means 13 is for selective placement over the terminal T to be cleaned. The body means 13 includes a first body member 17 and a second body member 19. The first body member 17 has a cavity therein (see FIGS. 2, 3 and 5) for receiving a portion of the battery terminal T to be cleaned. More specifically, the first body member 17 has a face portion 23 having a normally upwardly directed top edge 23' and a normally downwardly directed bottom edge 23" (see, in general, FIG. 2). The cavity 21 is in the face surface 23 of the first body member 17 and extends upwardly from the bottom edge 23" thereof (see, in general, FIG. 2). The cavity 21 preferably has a cross-sectional shape of a portion of a circle that is less than half a complete circle as clearly shown in FIG. 5. Additionally, the cavity 21 preferably tapers upwardly as clearly shown in FIGS. 2 and 3 so as to form the shape of a truncated cone cut substantially in half along its longitudinal axis. The first body member 17 also includes a plurality of teeth members 25 attached to portions of the cavity 21 for engaging portions of the battery terminal T received in the cavity 21. The teeth may be formed in any manner apparent to those skilled in the art. For example, grooves may be cut into the sides of the cavity 21 in a criss-cross manner to form the plurality of teeth members 25. The teeth members 25 thus formed will resemble the teeth members of a typical cross-cut file. The inventor has determined that the cleaner 11 will perform optimumly if the teeth members 25 are formed in substantially the same size and with substantially the same spacing as the teeth members of a typical 12-inch (30.48 centimeters) flat file. It should be noted that the teeth members 25 may be formed in a separate insert 26 or the like which is shaped so as to closely fit into the cavity 21 and which may be glued to the surface of the cavity 21 thereby allowing the teeth members 25 to be replaced in the event they become worn with use or the like without requiring the entire body member 17 to be replaced. The first body member 17 may include a substantially transverse groove 27 in the outer surface thereof for receiving the spring means 15 as will hereinafter become apparent. The body member 17 may be substantially made of high-impact nonconductive plastic-type material or the like. However, the teeth members 25 should be constructed of a wear resistant material such as file grade steel.

The second body member 19 of the body means 13 is preferably a substantial mirror image of the first body member 17 thereof for coacting with the first body member 17 to substantially enclose the battery terminal T to be cleaned. More specifically, the second body member 19 includes a cavity 29 for receiving a portion of the battery terminal T to be cleaned. The cavity 29 is substantially identical to the cavity 21 in the first body member 17. The second body member 19 also includes a plurality of teeth members 31 substantially identical to the teeth members 25 and attached to portions of the cavity 29 for engaging portions of the battery terminal T received in the cavity 29. Also, the second body member 19 may include a substantially transverse groove 33 in the outer surface thereof for receiving the spring means 15.

Figure 6:
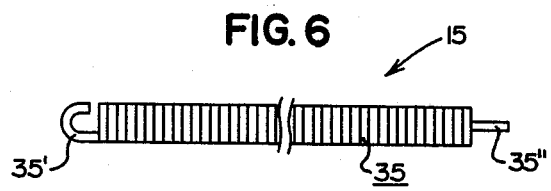
FIG. 6 is a top plan view of the spring means of the battery terminal cleaner of the present invention.
Figure 7:
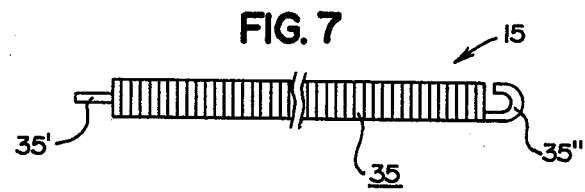
FIG. 7 is a side elevational view of FIG. 6.

The spring means 15 is positioned circumferentially about the first and second body members 17, 19 for uniformly urging the cavities 21, 29 of the first and second body members 17, 19 towards one another to cause the teeth members 25, 31 of the first and second body members 17, 19 to engage the battery terminal T received in the cavities 21, 29 so that when the body means 13 is rotated, the teeth members 25, 31 will clean the battery terminal T by uniformly scraping any contamination or the like therefrom. The spring means 15 preferably consists of an elongated coil spring member 35 having first and second ends 35', 35" adapted to be selectively attached to one another so as to fixedly mount the spring member 35 in the grooves 27, 33 in the first and second body members 17, 19. More specifically, the first and second ends 35', 35" of the spring member 35 may be provided with hooklike means as shown in FIGS. 6 and 7 for being selectively attached to one another in a manner which should now be apparent to those skilled in the art. The spring means 15 is preferably made of an acid resistant material.

The battery terminal cleaner 11 may also include a grip means 37 for being operatively coupled to the body means 13 to allow the user of the battery terminal cleaner 11 to manually rotate the body means 13 thereof by manually rotating the grip means 37. The grip means 37 preferably includes a substantially spherical grip member 39, a leg member 41, and a substantially plate-like foot member 43. The leg member 41 has a first end 41' attached to the grip member 39 and has a second end 41" attached to the foot member 43 (see FIGS. 2 and 3). A portion of the grip member 43 is knurled or otherwise roughened so as to provide the user of the battery terminal cleaner 11 a substantially slip-free surface on the grip means 37. More specifically, grooves or the like may be cut into the grip member 39. The foot member 43 has a top 43a, a bottom 43b and four sides 43c positioned substantially at right angles to one another so as to form a substantially square or rectangular plate-like structure as should be apparent from FIGS. 2, 3 and 4. The grip means 37 may be made of a high impact non-conductive plastic type material or of a conductive metal coated with a nonconductive material.

Figure 4:
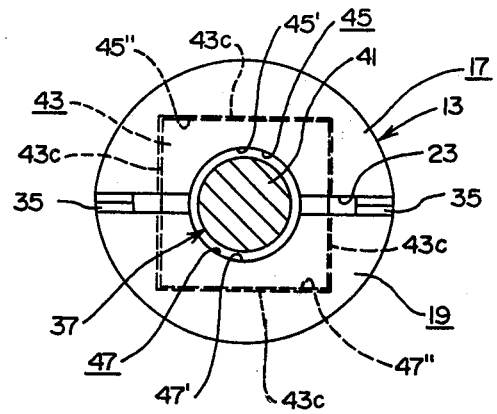
FIG. 4 is a sectional view thereof as taken on line IV—IV of FIG. 2.

The first body member 17 of the body means 13 preferably has a cavity 45 in the face 23 thereof having a shape substantially identical to a portion of the foot member 43 and the leg member 41 of the grip means 37 for non-rotatably receiving portions of the foot member 43 and the leg member 41 (see FIGS. 2, 3 and 4). More specifically, the cavity 45 extends downward from the top edge 23' of the face surface 23 of the first body member 17 and includes a first portion 45' having a cross-sectional shape substantially identical to half the cross-sectional shape of the leg member 41 of the grip means 37 for receiving substantially half of the lower portion of the leg member 41 as clearly shown in FIGS. 2, 3 and 4 and includes a second portion 45" communicated with the first portion 45' thereof and having a cross sectional shape substantially identical to half the cross-sectional shape of the foot member 43 of the grip means 37 for non-rotatably receiving substantially half of the foot member 43 as clearly shown in FIGS. 2, 3 and 4. The second body member 19 includes a cavity 47 that is substantially a mirror image of the cavity 45, having a first portion 47' for receiving substantially half of the lower portion of the leg member 41 and having a second portion 47" for non-rotatably receiving substantially half of the foot member 43 whereby the first and second body members 17, 19 coact with one another to substantially enclose the foot member and the lower part of the leg member 41 of the grip means 37 in a manner as should now be apparent to persons skilled in the art.

To use the battery terminal cleaner 11 to clean a battery terminal T, the body means 13 is merely placed over the battery terminal T so that the terminal T is received in the cavity 21, 29. The spring means 15 will cause the teeth members 25, 31 of the body means 13 to uniformly engage the terminal T and thereby self-adjust the battery terminal cleaner 11 onto the terminal T. Next, the user of the battery terminal cleaner 11 merely grips the grip member 39 and rotates the grip member 39 back and forth as indicated by the arrows 49 on FIG. 5 or completely around in either a clockwise or counterclockwise direction.

Although the invention has been described and illustrated with respect to a preferred embodiment thereof, it is not to be so limited since changes and modifications may be made therein which are within the full intended scope of the invention.

I claim:
1. A battery terminal cleaner comprising:
  (a) body means for placement over the battery terminal to be cleaned, said body means including a first body member having a cavity therein for receiving a portion of the battery terminal to be cleaned and having a plurality of teeth members attached to portions of said cavity for engaging portions of the battery terminal received in said cavity, said body means including a second body member having a cavity therein for receiving another portion of the battery terminal to be cleaned and having a plurality of teeth members attached to portions of said cavity for engaging portions of the battery terminal received in said cavity; and
  (b) spring means positioned circumferentially about said first and second body members for uniformly urging said cavities of said first and second body members towards one another to cause said teeth members of said first and second body members to engage the battery terminal received in said cavities so that when said body means is rotated, said teeth members will clean the battery terminal.

2. The battery terminal cleaner of claim 1 in which in included grip means operatively coupled to said body means for allowing the user of said battery terminal cleaner to manually rotate said body means thereof by manually rotating said grip means.

3. The battery terminal cleaner of claim 2 in which said grip means includes a substantially spherical grip member, a leg member, and a substantially plate-like foot member; said leg member having a first end attached to said spherical grip member and having a second end attached to said foot member, a portion of said spherical grip member being roughened so as to provide the user of said battery terminal cleaner a substantially slip-free surface on said grip means, said foot member having a top, a bottom and four sides positioned substantially at right angles to one another; and in which said first and second body members of said body means have cavities therein having shape substantially identical to portions of said foot member and said leg member of said grip means for nonrotatably receiving said foot member and a portion of said leg member of said grip means.

4. The battery terminal cleaner of claim 1 in which said cavities in said first and second body members of said body means for receiving a portion of the battery terminal to be cleaned are each in the shape of a truncated cone cut substantially in half along its longitudinal axis.

5. The battery terminal cleaner of claim 4 in which said spring means consist of an elongated coil spring member having first and second ends adapted to be selectively attached to one another, and in which said first and second body members of said body means each include a substantially transverse groove in the outer surfaces thereof for receiving said spring means.

6. A self-adjusting battery terminal cleaner comprising:
   (a) grip means including a substantially spherical grip member and including a leg member having first and second ends, said first end of said leg member being attached to said spherical grip member, said grip means including a substantially plate-like foot member attached to said second end of said leg member, said foot member having four sides positioned at substantially right angles to one another;
   (b) body means for selective placement over the battery terminal to be cleaned, said body means including a first body member, said first body member including a face surface having a top edge and a bottom edge, said first body member having a first cavity in said face surface thereof extending upwardly from said bottom edge thereof for receiving a portion of the battery terminal to be cleaned and having a second cavity in said face surface thereof extending downwardly from said top edge thereof for receiving a portion of said leg member and said foot member of said grip means, said first cavity of said first body member having a cross-sectional shape of a portion of a circle that is less than half of a complete circle, said first cavity of said first body member tapering upwardly, said first body member having a plurality of teeth members provided in said first cavity of said first body member, said second cavity of said first body member including a first portion having a cross-sectional shape substantially identical to half the cross-sectional shape of said leg member of said grip means for receiving substantially half of said leg member and including a second portion communicated with said first portion thereof and having a cross-sectional shape substantially identical to half the cross-sectional shape of said foot member of said grip means for nonrotatably receiving substantially half of said foot member; said body means including a second body member, said second body member being substantially a mirror image of said first body member for coacting with said first body member to substantially enclose a portion of said leg member and said foot member of said grip means and the battery terminal to be cleaned; and
   (c) spring means positioned circumferentially about said first and second body members for uniformly urging said face surfaces of said first and second body members of said body means towards one another to cause said foot member of said grip means and the battery terminal to be cleaned to be trapped therebetween whereby manual rotation of said grip means will cause said body means to likewise rotate so that said teeth members of said first and second body members will clean the battery terminal enclosed within said first cavities of said first and second body members.

* * * * *